US006798459B1

(12) United States Patent
Izumi

(10) Patent No.: US 6,798,459 B1
(45) Date of Patent: Sep. 28, 2004

(54) APPARATUS AND METHOD FOR TRANSMITTING AND RECEIVING, AS AN ELECTRIC WAVE, A SIGNAL GENERATED BY ELECTRONIC EQUIPMENT, AND A CONTROL SIGNAL TO CONTROL OPERATION OF THE ELECTRONIC EQUIPMENT

(75) Inventor: Shinobu Izumi, Saitama (JP)

(73) Assignee: Sony Corporation (JP)

( * ) Notice: Subject to any disclaimer, the term of this patent is extended or adjusted under 35 U.S.C. 154(b) by 317 days.

(21) Appl. No.: 09/653,631

(22) Filed: Sep. 1, 2000

(30) Foreign Application Priority Data

Sep. 8, 1999 (JP) .......................................... P11-254787

(51) Int. Cl.[7] .................................................. H04N 7/00
(52) U.S. Cl. ........................ 348/552; 348/706; 725/80; 725/81
(58) Field of Search ............................. 348/211.8, 211.2, 348/211.14, 113, 154, 159, 552, 705, 706; 725/80, 81

(56) References Cited

U.S. PATENT DOCUMENTS

| 5,079,634 | A | * | 1/1992 | Hosono .................... 348/211.8 |
| 5,475,835 | A | * | 12/1995 | Hickey ....................... 395/600 |
| 5,719,622 | A | * | 2/1998 | Conway .................. 348/211.8 |
| 5,774,063 | A | * | 6/1998 | Berry et al. ........... 340/825.69 |
| 5,982,363 | A | * | 11/1999 | Naiff .......................... 345/327 |
| 5,995,155 | A | * | 11/1999 | Schindler et al. ........... 348/461 |
| 6,034,722 | A | * | 3/2000 | Viney et al. ................ 348/138 |
| 6,161,933 | A | * | 12/2000 | Tschida et al. ............. 352/179 |
| 6,282,714 | B1 | * | 8/2001 | Ghori et al. ................... 725/81 |
| 6,385,772 | B1 | * | 5/2002 | Courtney .................... 725/105 |
| 6,577,326 | B1 | * | 6/2003 | Heuvelman et al. ........ 345/717 |

FOREIGN PATENT DOCUMENTS

WO    WO 98/39766 A1    9/1998

* cited by examiner

Primary Examiner—Victor R. Kostak
(74) Attorney, Agent, or Firm—Lerner, David, Littenberg, Krumholz & Mentlik, LLP

(57) ABSTRACT

A display apparatus signal transmitting and receiving apparatus, radio-transmission apparatus and a signal transmitting and receiving method are disclosed herein. A display apparatus is adapted to output a signal generated by electronic equipment. The display apparatus includes a control-signal receiving unit for receiving a control signal to control operations of the electronic equipment. An antenna is included for receiving the signal transmitted by the electronic equipment as an electric wave, and for transmitting the control signal. A control unit of the display apparatus is adapted to convert the control signal received by the control-signal receiving unit into a control signal that is transmissible as an electric wave, to supply the transmissible control signal to the antenna, and to carry out signal processing for outputting the signal received from the electronic equipment.

12 Claims, 2 Drawing Sheets

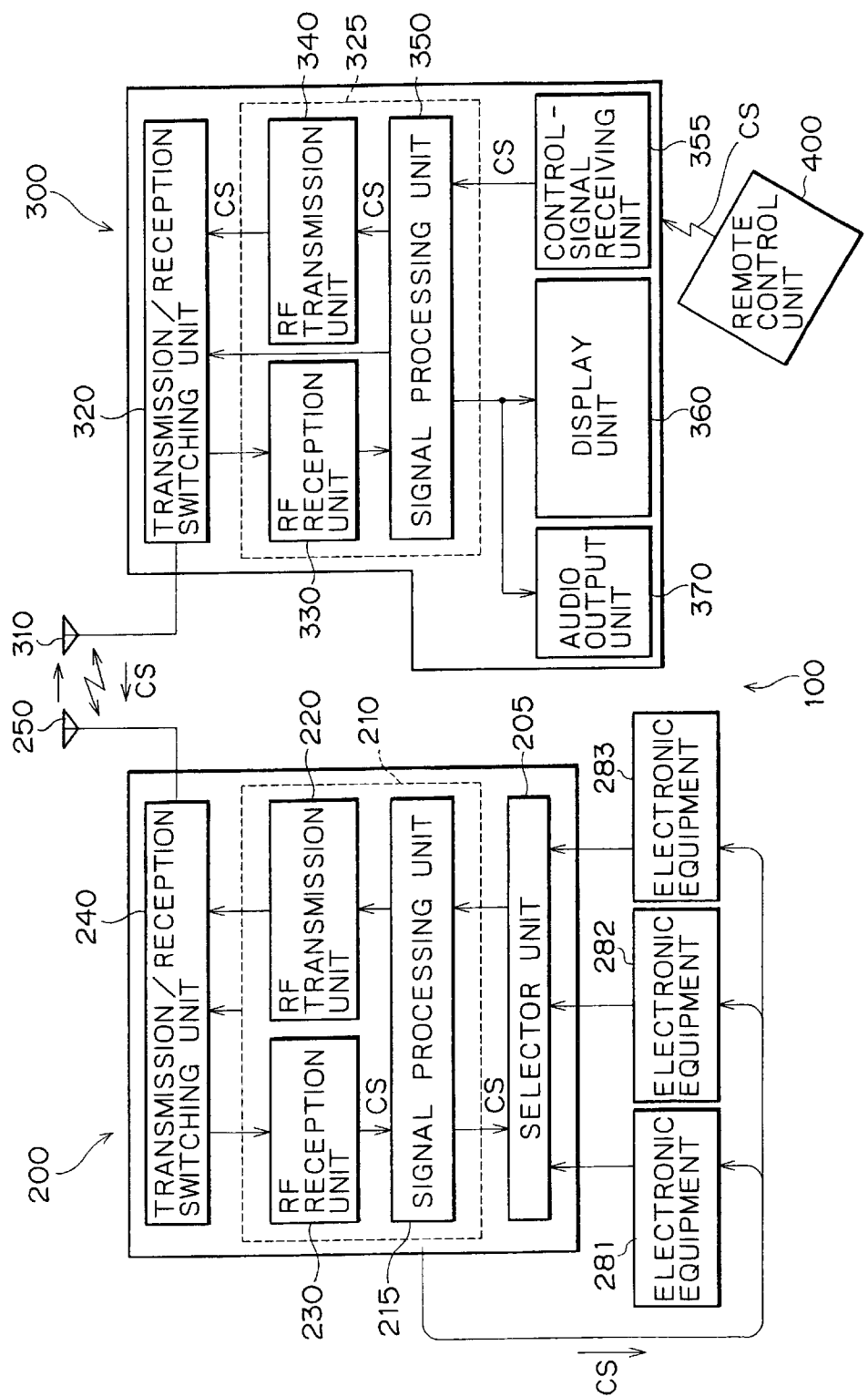

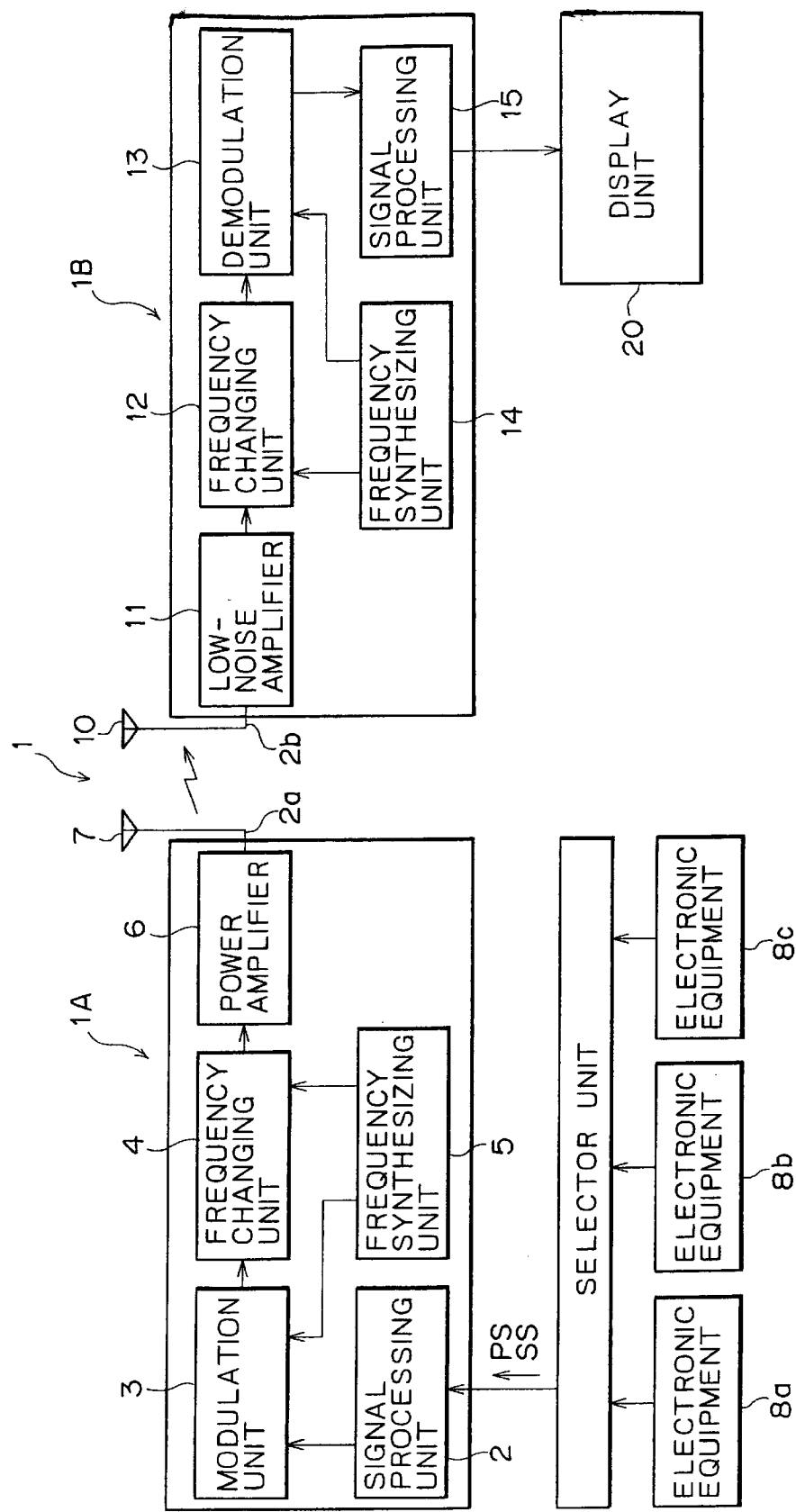

APPARATUS AND METHOD FOR TRANSMITTING AND RECEIVING, AS AN ELECTRIC WAVE, A SIGNAL GENERATED BY ELECTRONIC EQUIPMENT, AND A CONTROL SIGNAL TO CONTROL OPERATION OF THE ELECTRONIC EQUIPMENT

BACKGROUND OF THE INVENTION

In general, the present invention relates to improvement of a display unit, a display control unit and a radio transmission apparatus. More particularly, the present invention relates to improvement of a display unit such as a television receiver and a liquid-crystal display unit, a display control unit and a radio transmission apparatus.

FIG. 2 is a diagram showing the configuration of a typical conventional radio transmission apparatus 1. The radio transmission apparatus 1 is explained by referring to FIG. 2.

As shown in FIG. 2, the radio transmission apparatus 1 comprises a signal transmitting apparatus 1A and a signal receiving apparatus 1B. The signal transmitting apparatus 1A comprises components including a signal processing unit 2, a modulation unit 3, a frequency changing unit 4, a frequency synthesizing unit 5, a power amplifier 6 and a transmission antenna 7.

The signal processing unit 2 comprises components including a buffer amplifier and a filter. The signal processing unit 2 sets the amplitudes of a video signal VS and an audio signal AS received from pieces of electronic equipment 8a to 8c at levels proper for modulation.

Examples of the pieces of electronic equipment 8a to 8c are an audio tape recorder, an optical-disc drive and a digital CS tuner, which each supply a signal VS and a signal AS to a selector unit 9. The selector unit 9 selects one of the pieces of electronic equipment 8a to 8c, passing on a video signal VS and an audio signal AS received from the selected piece of electronic equipment to the signal processing unit 2.

The modulation unit 3 modulates a carrier based on a frequency of an IF (Intermediate Frequency) signal received from the frequency synthesizing unit 5. The frequency changing unit 4 mixes the IF signal received from the modulation unit 3 with a signal having a locally generated frequency received from the frequency synthesizing unit 5 to generate an RF signal.

The power amplifier 6 amplifies the RF signal received from the frequency changing unit 4 to a signal with a prescribed power. The transmission antenna 7 has a function for transmitting the amplified RF signal to the outside world. That is, the transmission antenna 7 transmits the audio signal AS and the video signal VS, which were converted into the RF signal, to the outside world.

On the other hand, the signal receiving unit 1B comprises components including a reception antenna 10, a low-noise amplifier 11, a frequency changing unit 12, a demodulation unit 13, a frequency synthesizing unit 14 and a signal processing unit 15. The reception antenna 10 receives the RF signal from the transmission antenna 7. The low-noise amplifier 11 has a function to amplify the RF signal received by the reception antenna 10. The frequency changing unit 12 mixes the amplified RF signal with a signal having a locally generated frequency from the frequency synthesizing unit 14 to generate an IF signal.

The demodulation unit 13 has a function to demodulate the IF signal with a frequency generated by the frequency synthesizing unit 14 to produce the audio signal AS and the and video signal VS. The signal processing unit 15 removes noises included in the audio signal AS and the video signal VS, amplifies the signals and displays the amplified signals on a display unit 20. Examples of the display unit 20 are a television receiver and an LCD unit, which each have a function to generate a picture based on the video signal VS and to output a sound based on the audio signal AS.

Next, a typical operation of the conventional radio transmission apparatus 1 is explained by referring to FIG. 2.

First of all, the piece of electronic equipment 8a, 8b or 8c outputs the video signal VS and the audio signal AS to the selector unit 9. Then, the selector unit 9 selects one of the pieces of electronic equipment 8a to 8c, passing on the video signal VS and the audio signal AS received from the selected piece of electronic equipment to the signal processing unit 2. The video signal VS and the audio signal AS are processed by the signal processing unit 2, the modulation unit 3 and the frequency changing unit 4, being converted into an RF signal, which is then amplified by the power amplifier 6 before being output as an electric wave from the transmission antenna 7.

The RF signal is received by the reception antenna 10 and processed by the low-noise amplifier 11, the frequency changing unit 12 and the demodulation unit 13, being demodulated into the VS signal and AS signal. Then, the VS signal and the AS signal are supplied to the display unit 20, being output as an image and a sound respectively.

In the radio transmission apparatus 1 shown in FIG. 2, to change an image and a sound output by the signal processing unit 20, it is necessary to carry out predetermined operations on the piece of electronic equipment 8a, 8b or 8c. In addition, if the signal transmitting apparatus 1A, the signal receiving apparatus 1B and the pieces of electronic equipment 8a to 8c are placed at locations separated from each other, there will be a problem if the signal receiving apparatus 1B and the pieces of electronic equipment 8a to 8c need to be operated frequently. For example, assume that the signal transmitting apparatus 1A and the signal receiving apparatus 1B are placed in different rooms. A problem encountered in this case is that it is difficult to operate the pieces of electronic equipment 8a to 8c and the selector unit 9 by using an infrared remote controller from the room in which the signal receiving apparatus 1B is placed.

In particular, to operate the pieces of electronic equipment 8a to 8c and the signal receiving apparatus 1B by using an infrared remote controller, operations must be carried out by orienting the infrared remote controller to the piece of electronic equipment 8a, 8b or 8c, or the signal receiving apparatus 1B due to the directivity of an infrared ray generated by the remote controller. Thus, there is also encountered a problem of cumbersome operations, which must be carried out by orienting the infrared remote controller to the piece of electronic equipment 8a, 8b or 8c, or the signal receiving apparatus 1B.

In addition, if the display apparatus 20 is installed at a location different from that of the signal receiving apparatus 1B, the number of cables connecting the display apparatus 20 to the signal receiving apparatus 1B will increase, raising a problem of cabling complexity.

SUMMARY OF THE INVENTION

It is thus an object of the present invention addressing the problems described above to provide a display apparatus, a display control apparatus and a radio transmission apparatus that are capable of improving the user interface.

The above object can be achieved by a display apparatus, signal transmitting and receiving apparatus, radio transmission apparatus and signal transmitting and receiving method according to the invention.

According to an aspect of the invention, a display apparatus is provided for outputting a signal generated by electronic equipment. The display apparatus includes a control signal receiving unit for receiving a control signal to control operation of the electronic equipment. An antenna is included for receiving the signal transmitted by the electronic equipment as an electric wave, and for transmitting the control signal as an electric wave. A control unit of the display apparatus is adapted to convert the control signal received by the control-signal receiving unit into a control signal that is transmissible as an electric wave, to supply the transmissible control signal to the antenna, and to carry out signal processing for outputting the signal received from the electronic equipment.

According to another aspect of the invention, a signal transmitting and receiving apparatus is provided which includes a control unit for converting a signal generated by electronic equipment into a signal transmissible as an electric wave. An antenna is included for transmitting the transmissible signal generated by the control unit as an electric wave. The antenna has a function to receive a control signal for controlling operation of the electronic equipment and the control unit has a function to control the operation of the electronic equipment in accordance with the control signal received by the antenna.

According to yet another aspect of the invention, a radio transmission apparatus includes a signal transmitting and receiving apparatus for transmitting a signal generated by electronic equipment as an electric wave and a display apparatus for receiving and displaying the signal. The display apparatus has a function to receive a control signal for controlling operation of the electronic equipment, and a function to transmit the control signal as an electric wave. The signal transmitting and receiving apparatus has a function to receive the control signal transmitted as the electric wave and a function to control operation of the electronic equipment in accordance with the control signal.

According to yet another aspect of the invention, a signal transmitting and receiving method includes converting a signal generated by electronic equipment into a signal transmissible as an electric wave, and transmitting the transmissible signal through an antenna as an electric wave, and further includes receiving a control signal for controlling an operation of the electronic equipment through the antenna, and controlling operation of the electronic equipment in accordance with the control signal received by the antenna.

BRIEF DESCRIPTION OF THE DRAWINGS

FIG. 1 is a diagram showing the configuration of a preferred embodiment implementing a radio transmission apparatus provided by the present invention; and FIG. 2 is a diagram showing the configuration of a typical conventional radio transmission apparatus.

DETAILED DESCRIPTION OF THE PREFFERED EMBODIMENT

Next, a preferred embodiment of the present invention is described by referring to an accompanying diagram.

It should be noted that, since the embodiment described below is a preferred embodiment of the present invention, a variety of technologically preferred restrictions are imposed. However, the scope of the present invention is not limited to the embodiment as long as a description limiting the present invention is not given in particular.

FIG. 1 is an explanatory diagram showing the configuration of a preferred embodiment implementing a radio transmission apparatus provided by the present invention. The radio transmission apparatus 100 is explained by referring to FIG. 1 as follows.

The radio transmission apparatus 100 shown in FIG. 1 comprises a signal transmitting and receiving apparatus 200 and a display apparatus 300. The signal transmitting and receiving apparatus 200 comprises components including a selector unit 205, a control unit 210, a transmission/reception switching unit 240 and an antenna 250.

The selector unit 205 has a plurality of input terminals, which are connected to pieces of electronic equipment 281, 282 and 283 respectively. Examples of the pieces of electronic equipment 281, 282 and 283 are an audio tape recorder, an optical-disc drive and a digital CS tuner, which each supply a video signal VS and an audio signal AS to a selector unit 205. The video signal VS and the audio signal AS are also referred to as an AV (Audio Visual) signal. The selector unit 205 selects one of the pieces of electronic equipment 281, 282 and 283, passing on the AV signal received from the selected piece of electronic equipment to the control unit 210.

The control unit 210 has a function to control the operations of the selector unit 205 and the transmission/reception switching unit 240 as well as a function to control the operations of the pieces of electronic equipment 281, 282 and 283 on the basis of a control signal CS to be described later.

In addition, the control unit 210 includes a signal processing unit 215, an RF transmission unit 220 and an RF reception unit 230. The signal processing unit 215 modulates the video signal VS and the audio signal AS received thereby to generate an RF signal converted into an appropriate amplitude. That is, the control unit 210 converts the video signal VS and the audio signal AS into RF signals, which can be transmitted as an electric wave.

The RF transmission unit 220 comprises components including a modulator for modulating a carrier with the video signal VS and the audio signal AS, a frequency changer as well as a local oscillator, which are used for carrying out frequency conversion to generate a high-frequency signal, a PLL circuit, a transmission filter and a power amplifier. The RF transmission unit 220 has a function to modulate an RF signal received from the signal processing unit 215, amplify the modulated signal and output the amplified signal.

The RF reception unit 230 comprises components including a low-noise amplifier, a reception filter, a frequency converter, a local oscillator and a PLL circuit. The RF reception unit 230 has a function to demodulate a LW control signal CS received from the antenna 250.

The transmission/reception switching unit 240 supplies the RF signal received from the RF transmission unit 220 to the antenna 250 and supplies the control signal CS received from the antenna 250 to the RF reception unit 230.

The antenna 250 has functions to transmit the modulated RF signal as an electric wave and receive the control signal CS coming as an electric wave.

A typical operation of the signal transmitting and receiving apparatus 200 is explained by referring to FIG. 1.

First of all, the selector unit 205 selects one of the pieces of electronic equipment 281, 282 and 283, passing on a video signal VS and an audio signal AS received from the selected piece of electronic equipment to the signal processing unit 215 by way of the selector unit 205, which converts the video signal VS and the audio signal AS into an RF signal. Then, the RF transmission unit 220 converts the RF signal into a high-frequency signal, which is supplied to the antenna 250 by way of the transmission/reception switching unit 240.

On the other hand, the antenna 250 receives a control signal CS arriving as an electric wave and supplies the control signal CS to the RF reception unit 230 by way of the transmission/reception switching unit 240. After being subjected to frequency conversion in the RF reception unit 230, the control signal CS is supplied to the signal processing unit 215. In this way, the control unit 210 controls the operations of the pieces of electronic equipment 281, 282 and 283 in accordance with the control signal CS.

In addition to transmission of a video signal VS and an audio signal AS, the signal transmitting and receiving apparatus 200 shown in FIG. 1 also receives a control signal CS and controls the operations of the pieces of electronic equipment 281, 282 and 283 in accordance with the control signal CS. In this way, the pieces of electronic equipment 281, 282 and 283 are controlled remotely and in a centralized manner.

Next, the display apparatus 300 is explained by referring to FIG. 1.

The display apparatus 300 shown in FIG. 1 comprises components including an antenna 310, a transmission/reception switching unit 320, a control unit 325, a display unit 360 and an audio output unit 370. The antenna 310 has a function to receive a video signal VS and an audio signal AS which are RF signals transmitted as an electric wave. The antenna 310 also has a function to transmit a control signal CS.

The transmission/reception switching unit 320 switches the display apparatus 300 from a reception mode to a transmission mode and vice versa. In the reception mode, the antenna 310 receives a video signal VS and an audio signal AS. In the transmission mode, on the other hand, the antenna 310 transmits a control signal CS.

Provided with a function to control the operation of the transmission/reception switching unit 320, the control unit 325 comprises components including an RF transmission unit 340, an RF reception unit 330 and a signal processing unit 350.

The RF reception unit 330 comprises components including a low-noise filter, a reception filter, a frequency converter, a local oscillator and a PLL circuit. The RF reception unit 330 has a function to demodulate a video signal VS and an audio signal AS received by the antenna 310.

The RF transmission unit 340 comprises components including a modulator for modulating a carrier with the control signal CS, a frequency changer as well as a local oscillator, which are used for carrying out frequency conversion to generate a high-frequency signal, a PLL circuit, a transmission filter and a power amplifier. The RF transmission unit 340 has a function to modulate the CS signal received from the signal processing unit 350, amplify the modulated signal and output the amplified signal.

The signal processing unit 350 has functions to filter the video signal VS and the audio signal AS as well as to change their formats, and output the filtered and reformatted signals to the display unit 360. The signal processing unit 350 also receives the control signal CS transmitted by a remote control unit 400 by way of an optical receiver 355, which serves as a control-signal reception unit for receiving the control signal CS. The signal processing unit 350 also has a function to modulate the received control signal CS and converts the modulated control signal CS into an RF signal having a proper amplitude.

That is, the control unit 325 has a function to convert the control signal CS into an RF signal that can be transmitted as an electric wave. In addition, the control unit 325 also has a function to convert the video signal VS and the audio signal AS, which are received as an RF signal, into signals recognizable by the display unit 360 and the audio output unit 370 respectively.

Implemented by typically a thin display unit such as a liquid-crystal display unit, a plasma display unit or a TFT display unit, the display unit 360 has a function to output an image based on the video signal VS.

The audio output unit 370 is typically a speaker provided inside or outside the display apparatus 300 for outputting a sound based on the audio signal AS.

Next, a typical operation of the display apparatus 300 is explained by referring to FIG. 1.

First of all, the antenna 310 receives a video signal VS and an audio signal AS, which are transmitted as an electric wave of an RF signal, and supplies the video signal VS and the audio signal AS to the RF reception unit 330 by way of the transmission/reception switching unit 320. The RF signal is then demodulated into a video signal VS and an audio signal AS before being supplied to the signal processing unit 350. The signal processing unit 350 changes the formats of the video signal VS and the audio signal AS to predetermined formats before supplying the video signal VS to the display unit 360 and the audio signal AS to the audio output unit 370. The display unit 360 outputs an image based on the video signal VS and the audio output unit 370 outputs a sound based on the audio signal AS.

When the user operates the remote control unit 400, the remote control unit 400 transmits a control signal CS to the control-signal reception unit 355. The control signal CS is then converted into an RF signal in the signal processing unit 350 and the RF transmission unit 340. Then, the control signal CS converted into the RF signal is supplied to the antenna 310 by way of the transmission/reception switching unit 320. Finally, the antenna 310 transmits the RF signal to the outside world as an electric wave.

In accordance with the display apparatus shown in FIG. 1, a control signal CS, including control information for the pieces of electronic equipment 281, 282 and 283, is received by the display apparatus 300 and then transmitted by the antenna 310, making the pieces of electronic equipment 281, 282 and 283 easy to operate. That is, the user needs merely to operate the remote control unit 400 to transmit the control signal to the display apparatus 300 only. In this way, it is possible to control the display apparatus 300 and the pieces of electronic equipment 281, 282 and 283 in a centralized manner, allowing the user interface to be improved.

In addition, in the radio transmission apparatus 100 shown in FIG. 1, the signal transmitting and receiving apparatus 200 transmits a video signal VS and an audio signal AS as an electric wave to the display apparatus 300. On the other hand, the display apparatus 300 transmits a control signal CS to the signal transmitting and receiving apparatus 200 as an electric wave.

The signal transmitting and receiving apparatus 200 controls the operations of the pieces of electronic equipment 281, 282 and 283 on the basis of the received control signal CS to adjust the video signal VS and the audio signal AS which are transmitted to the display apparatus 300. On the other hand, the display apparatus 300 outputs an image and a sound based on the received video signal VS and the received audio signal AS, respectively.

In accordance with the embodiment described above, a video signal VS and an audio signal AS are transmitted from the signal transmitting and receiving apparatus 200 to the display apparatus 300 while a control signal CS is transmitted from the display apparatus 300 to the signal transmitting and receiving apparatus 200. By controlling the display unit 360 and the pieces of electronic equipment 281, 282 and 283, the user interface can be improved. More particularly, assume that the pieces of electronic equipment 281, 282 and 283 connected to the signal transmitting and receiving apparatus 200 are placed at locations separated from a room in which the display apparatus 300 is located. In this case, the pieces of electronic equipment 281, 282 and 283 probably cannot be operated directly by using the remote control unit 400. With the configuration provided by the present invention, however, the user is capable of operating the pieces of electronic equipment 281, 282 and 283 through operations of the remote control unit 400 by orienting the remote control unit 400 toward the display apparatus 300.

In addition, since duplex communication between the signal transmitting and receiving apparatus 200 and the display apparatus 300 is possible, the types of the pieces of equipment 281, 282 to 283 connected to the signal transmitting and receiving apparatus 200 can be displayed on the display apparatus 300. Thus, control and operations of the pieces of equipment 281, 282 to 283 can be managed in a centralized manner, typically by using a menu screen of the display apparatus 300. As a result, the user interface can be improved.

In addition, the selector unit 205 is incorporated in the signal transmitting and receiving apparatus 200 whereas a function to receive an AV signal is provided in the display apparatus 300. Therefore, the number of cords is small and wiring is well organized. Moreover, since the function to receive an AV signal is embedded in a wall-mounted television or an LCD television, there is no problem of a lack of installation space and the scene looks good.

Embodiments of the present invention are not limited to the embodiment described above.

For example, while only 3 pieces of electronic equipment 281, 282 and 283 are connected to the selector unit 205 in the embodiment shown in FIGS. 1, 2 or more, in fact, any number of pieces of electronic equipment can be connected.

In addition, while an audio tape recorder, an optical-disc drive and a digital CS tuner are cited as examples of the pieces of electronic equipment 281, 282 and 283 shown in FIG. 1, it is possible to use any electronic equipment outputting a video signal and an audio signal such as an apparatus for developing software like the so-called MPEG data and an electronic computer.

As described above, it is possible to provide a display apparatus, a display control apparatus and a radio transmission apparatus that are capable of improving the user interface.

What is claimed is:

1. A display apparatus for outputting a signal generated by electronic equipment, said display apparatus comprising:
a control-signal receiving unit for receiving a control signal transmitted by a remote control unit for controlling operation of a plurality of pieces of electronic equipment of different types, each piece of said plurality of pieces of electronic equipment being adapted to generate a signal including at least one of an audio signal for output by a speaker and a video signal for output on a display;
an antenna for wirelessly receiving said signal generated by a piece of said plurality of pieces of electronic equipment; and
a control unit having a function to convert said control signal received by said control-signal receiving unit into a wirelessly transmissible control signal, to supply said wirelessly transmissible control signal to said antenna for transmission by said antenna, and to carry out signal processing for outputting said signal generated by said piece of said plurality of pieces of electronic equipment for transduction as a sound by a speaker when said signal includes said audio signal and for display as an image when said signal includes said video signal.

2. A display apparatus according to claim 1, wherein:
said control signal for controlling said operation of said plurality of pieces of electronic equipment includes a signal for selecting a piece of equipment to be controlled from said plurality of pieces of electronic equipment.

3. The display apparatus according to claim 1, wherein said control signal receiving unit has a function to receive said control signal wirelessly.

4. The display apparatus according to claim 1, wherein said control signal receiving unit has a function to receive said control signal as an optical infrared signal.

5. A radio transmission apparatus, comprising:
a signal transmitting and receiving apparatus for wirelessly transmitting, a signal generated by a piece of a plurality of pieces of electronic equipment of different types, each piece of said plurality of pieces of electronic equipment being adapted to generate said signal, said signal including at least one of an audio signal for output on a speaker and a video signal for output on a display; and
a display apparatus operable to receive said signal and to display said signal as an image when said signal includes said video signal and to output said signal for transduction as a sound on a speaker when said signal includes said audio signal, wherein:
said display apparatus has a function to receive a control signal for controlling operation of a piece selected from said plurality of pieces of electronic equipment and a function to convert said received control signal into a wirelessly transmissible control signal; and
said signal transmitting and receiving apparatus has a function to wirelessly receive said transmissible control signal and a function to control operation of said selected piece of said plurality of pieces of electronic equipment in accordance with said received transmissible control signal.

6. The radio transmission apparatus according to claim 5, wherein said display apparatus has a function to receive said control signal wirelessly.

7. The radio transmission apparatus according to claim 5, wherein said display apparatus has a function to receive said control signal as an optical infrared signal.

8. A signal transmitting and receiving method, comprising the steps of:
converting, into a wirelessly transmissible signal, a signal generated by a piece of a plurality of pieces of electronic equipment of different types, said signal including at least one of an audio signal for output by a speaker and a video signal for output on a display, each piece of said plurality of pieces of electronic equipment being adapted to generate said signal;

transmitting said transmissible signal wirelessly through an antenna, receiving said transmissible signal at a display apparatus and outputting said signal as an image by said display apparatus when said signal includes said video signal and outputting said signal for transduction as a sound on the speaker when said signal includes said audio signal;

receiving a control signal by said display apparatus and converting said control signal into a wirelessly transmissible control signal, said control signal for controlling an operation of a piece selected from said plurality of pieces of electronic equipment;

receiving said transmissible control signal through said antenna; and controlling operation of said selected piece of said plurality of pieces of electronic equipment in accordance with said transmissible control signal received through said antenna.

9. A signal transmitting and receiving method according to claim 8, wherein:

a specific signal is selected among signals generated by said plurality of pieces of electronic equipment.

10. A signal transmitting and receiving method according to claim 9, wherein said specific signal is selected from among said signals generated by said plurality of pieces of electronic equipment in accordance with said control signal for controlling operation of said selected piece of said plurality of pieces of electronic equipment.

11. The signal transmitting and receiving method according to claim 8, wherein said control signal is received wirelessly.

12. The signal transmitting and receiving method according to claim 8, wherein said control signal is received as an optical infrared signal.

\* \* \* \* \*

UNITED STATES PATENT AND TRADEMARK OFFICE
CERTIFICATE OF CORRECTION

PATENT NO.    : 6,798,459 B1
DATED         : September 28, 2004
INVENTOR(S)   : Shinobu Izumi It is certified that error appears in the above-identified patent and that said Letters Patent is hereby corrected as shown below:

Column 4,
Line 56, after "transmitting" delete "LW".

Column 8,
Line 30, after "translating" delete ",".

Signed and Sealed this

Fifteenth Day of March, 2005

JON W. DUDAS
*Director of the United States Patent and Trademark Office*